United States Patent [19]

Groutage et al.

[11] Patent Number: 4,842,218
[45] Date of Patent: Jun. 27, 1989

[54] PIVOTAL MONO WING CRUISE MISSILE WITH WING DEPLOYMENT AND FASTENER MECHANISM

[75] Inventors: Frederick D. Groutage, Laramie, Wyo.; Samuel N. Conjerti; Lockburn S. Shaw, both of San Diego, Calif.

[73] Assignee: The United States of America as represented by the Secretary of the Navy, Washington, D.C.

[21] Appl. No.: 159,423

[22] Filed: Feb. 8, 1988

Related U.S. Application Data

[63] Continuation of Ser. No. 182,335, Aug. 29, 1980, abandoned.

[51] Int. Cl.⁴ .......................................... F42B 15/053
[52] U.S. Cl. ................................. 244/3.28; 244/137.4; 244/49; 89/1.815; 89/1.51
[58] Field of Search ............ 89/1.815, 1.8, 1.51, 89/1.54; 244/3.1, 3.24, 3.27, 328, 46, 49, 137.4; 74/2, 137, 144

[56] References Cited

U.S. PATENT DOCUMENTS

| | | | |
|---|---|---|---|
| 550,618 | 12/1895 | Howard | 74/2 X |
| 1,514,946 | 11/1924 | Wood | 74/2 X |
| 1,672,163 | 6/1928 | Krammer | 89/1.5 F |
| 2,365,577 | 12/1944 | Moore | 244/3.28 |
| 2,673,047 | 3/1954 | Scarato | 244/49 |
| 2,822,207 | 2/1958 | Steinmete et al. | 89/1.5 F |
| 2,876,677 | 3/1959 | Clark et al. | 244/3.1 |
| 2,949,822 | 8/1960 | Musser | 89/1.5 F |
| 3,008,376 | 11/1961 | Brunow et al. | 89/1.5 |
| 3,155,344 | 11/1964 | Vogt | 244/46 |
| 3,181,908 | 5/1965 | Clark | 89/1.5 |
| 3,313,236 | 11/1967 | Lohmann | 102/256 |
| 3,887,150 | 6/1975 | Jakubowski, Jr. | 244/137.4 |
| 3,967,529 | 7/1976 | Ingle et al. | 9/1.5 G |
| 3,971,535 | 7/1976 | Jones | 244/46 |
| 4,132,374 | 1/1979 | Abell | 244/46 |
| 4,191,377 | 3/1980 | Burnside | 74/577 S |
| 4,209,147 | 6/1980 | Jones, Jr. | 244/3.28 |
| 4,220,050 | 9/1981 | Friesen et al. | 74/2 |
| 4,256,012 | 3/1981 | Cowart et al. | 89/1.5 |
| 4,296,894 | 10/1981 | Schnabele et al. | 244/3.27 |

FOREIGN PATENT DOCUMENTS

| | | | |
|---|---|---|---|
| 13096 | 7/1980 | European Pat. Off. | 244/3.27 |
| 759679 | 10/1956 | United Kingdom | 244/3.28 |

Primary Examiner—Deborah L. Kyle
Assistant Examiner—Michael J. Carone
Attorney, Agent, or Firm—Harvey Fendelman; Thomas Glenn Keough

[57] ABSTRACT

A moveable wing aircraft including a quick release, attachment mechanism for carrying the aircraft on a bomb rack or other carrier and a mechanism for deploying the moveable wing from its captive carry position to its extended free flight position are disclosed. The aircraft includes an elongate fuselage, a portion of the top surface of which is substantially flat in order to accommodate the moveable wing. The moveable wing is positionable between a captive carry position in which it is aligned with the longitudinal axis of the fuselage and an extended free flight position. The single, moveable wing is pivoted around a central point from its captive carry position to its extended free flight position such that it is substantially perpendicular to the aircraft fuselage. The quick release mechanism extends through apertures in the wing in its captive carry position and is spring biased to retract through the wing and into the aircraft fuselage when released from the bomb rack or other carrier. The deployment mechanism includes a spring loaded cable and pulley arrangement and serves to connect the moveable wing to the fuselage and to bias it from its captive carry position to its extended free flight position when activated upon release of the quick release mechanism.

29 Claims, 4 Drawing Sheets

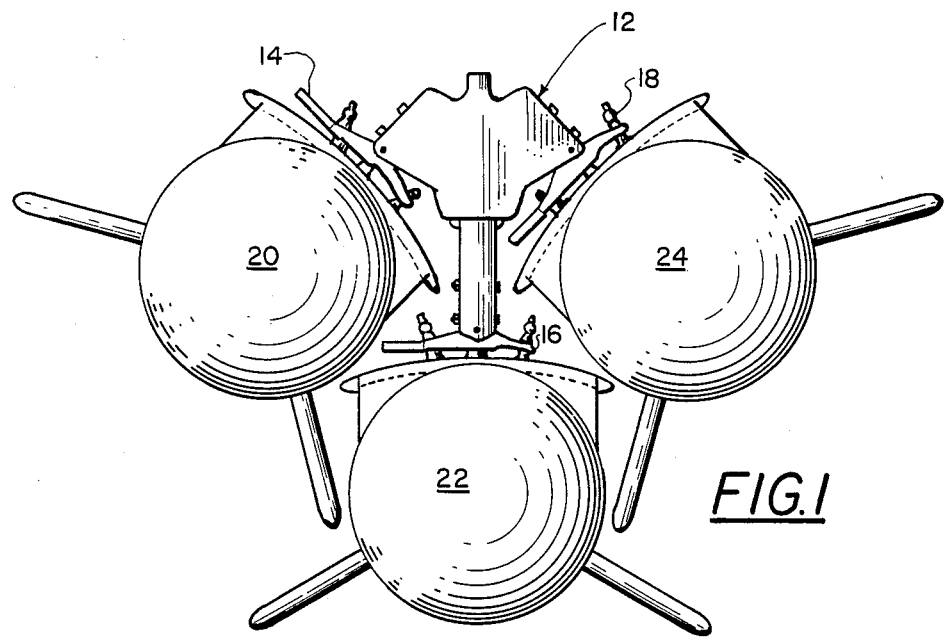
FIG.1
FIG.2
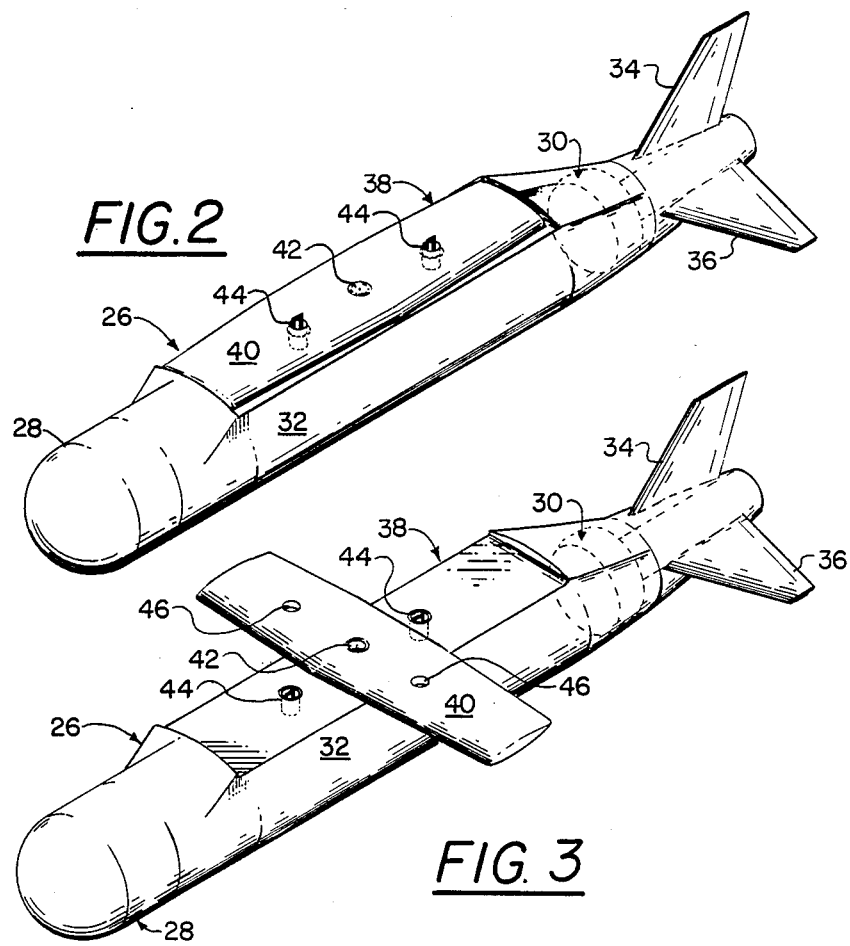
FIG.3

PIVOTAL MONO WING CRUISE MISSILE WITH WING DEPLOYMENT AND FASTENER MECHANISM

STATEMENT OF GOVERNMENT INTEREST

The invention described herein may be manufactured and used by or for the Government of the United States of America for governmental purposes without the payment of any royalties thereon or therefor.

This is a continuation of application Ser. No. 182,335, filed Aug. 29, 1980, now abandoned.

BACKGROUND OF THE INVENTION

The present invention relates generally to aircraft and more specifically to missiles that are borne aloft by and released from a carrier aircraft. Currently there are no air launch vehicles, i.e. cruise type aircraft with a turbo-jet engine, that can be carried and air launched as a 500 pound bomb. Prior art air launch vehicles have been disclosed but have been found to be unacceptable for various reasons. For instance, a swept wing design has been disclosed in the prior art in which two separate wings are positioned on top of the aircraft and are deployed when the aircraft is released from its carrier to a free flight position in which the wings are swept aft. This design suffers from the disadvantage that the wing cord dimension is approximately half of the fuselage width due to the fact that both separate wings must be stored adjacent each other on top of the vehicle. Other airborne missile designs such as that disclosed in U.S. Pat. No. 2,876,677 suffer from the inherent disadvantage of decreased packing density capability. Thus, an insufficient number of such airborne missiles can be carried by the carrier aircraft to render its mission effective.

SUMMARY OF THE INVENTION

The present invention relates to aircraft with a compactable, rotatable wing design. Also, the present invention relates to mechanisms for biasing a mechanical structure from one position such as a storage position towards another position such as a utility position. Further, the present invention relates to a quick release mechanism. More specifically, the present invention is concerned with a moveable wing aircraft, the mechanism for carrying the aircraft on a bomb rack attached to another aircraft and to a wing deployment mechanism for biasing the moveable wing from the captive carry position to the extended free flight position when activated following actuation of the quick release mechanism.

The aircraft and mechanizations of the present invention are particularly suitable for utilization in a cruise type missile where the missile is borne aloft and carried by a carrier aircraft. The design of the present invention achieves both maximum maneuverability of the missile as well as maximization of the packing density capability of the aircraft. The attachment mechanism of the present invention is of a retractable design such that during the captive carry position of the aircraft, the attachment mechanism extrudes from the fuselage body of the missile up through apertures in the wing structure. Following the release of the cruise missile from its bomb rack, the fastener mechanism retracts down through the pivotal wing into the fuselage. Once the fastener mechanisms have retracted into the fuselage, the wing deployment mechanism is activated which pivots the wing from its captive carry position in line with the fuselage to its extended free flight position perpendicular to the fuselage.

The missile fuselage itself is shaped to allow multiple loading on a bomb rack while optimizing the internal volume of the vehicle for maximum fuel and payload. The missile fuselage is designed with a recessed, flat upper surface which accommodates the pivoted wing during the carry position. The aircraft wing is a single wing configuration which pivots around a central pivot point, thereby achieving a large cord dimension. The increased cord dimension of the present design over prior art structures results in an aircraft that is much more maneuverable than prior designs.

OBJECTS OF THE INVENTION

Accordingly, it is the primary object of the present invention to disclose an aircraft having a single rotatable wing, a quick release mechanism for attachment to a carrier aircraft and a deployment mechanism for automatically rotating the single moveable wing around a pivot point from a storage position to a free flight extended position upon the release of the quick release mechanism to achieve a compact, carryable aircraft that is highly maneuverable.

It is another object of the present invention to disclose a novel aircraft having a rotatable wing that will automatically rotate from a position in line with the aircraft fuselage to an extended free flight position when the aircraft is released from its carrier.

It is a concomitant object of the present invention to disclose an aircraft that has a single relatively large cord wing that is rotatable from a storage position to an extended free flight position and which is not only highly maneuverable but also enables high density packing of more than one such aircraft.

It is another object of the present invention to disclose a quick release mechanism for attaching one mechanical device to another structure wherein the attachment mechanism automatically retracts into the mechanical device when released.

It is a still further object of the present invention to disclose a novel automatic quick release mechanism that accomplishes the foregoing object and also serves to prevent the actuation of another deployment mechanism until the quick release mechanism is fully retracted.

Another object of the present invention is to disclose a quick release mechanism that is highly stable, reliable and utilizes a minimum number of mechanical parts.

A still further object of the present invention is to disclose a simple automatic deployment mechanism for rotating an object from one position to another position when enabled, in a quick, efficient manner.

Another object of the present invention is to disclose a deployment mechanism in accordance with the foregoing object that requires only a minimum number of mechanical parts.

These and other objects of the invention will become more readily apparent from the ensuing specification when taken together with the accompanying drawings.

BRIEF DESCRIPTION OF THE DRAWINGS

FIG. 1 is an end view of a bomb rack showing the aircraft of the present invention in a three abreast loading arrangement.

FIG. 2 is an isometric view of the pivotal wing aircraft of the present invention with the moveable wing in the storage position.

FIG. 3 is an isometric view of the aircraft of the present invention illustrating the moveable wing in its extended free flight position.

DESCRIPTION OF THE PREFERRED EMBODIMENT

Figure 4:
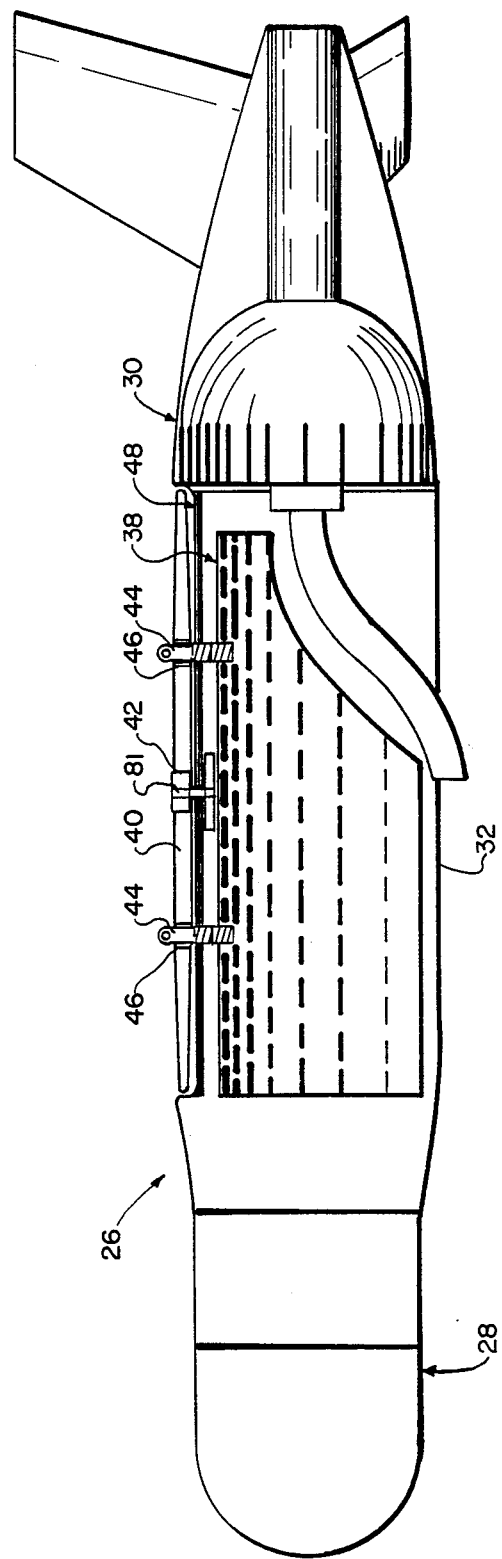
FIG. 4 is a cross section side view of the aircraft of the present invention with the moveable wing in the storage position.

Referring now to FIG. 1 there is illustrated a bomb rack 12 suitable for attaching the moveable wing aircraft of the present invention. The bomb rack 12 may be suspended from the wings of a mother aircraft as is well known and includes three carriage assemblies 14, 16 and 18 for carrying three cruise type missiles, bombs, or the like as is well known. As is apparent from FIG. 1 there is a limited amount of area within which to mount the cruise missiles 20, 22 and 24. Compactness of design of the cruise missile itself is therefore a critical requirement in achieving maximum packing density. It is noted that FIG. 1 is provided for illustrative purposes only so that the loading arrangement contemplated for the moveable wing aircraft of the present invention may be conceptualized.

Referring now to FIG. 2 there is illustrated the single, pivotal wing aircraft of the present invention with the pivotal wing thereof in the captive carry position. More particularly, the aircraft of the present invention comprises an elongate fuselage body 26 which has a payload area 28, and engine area 30 and a fuel area 32. The aircraft 26 also comprises a folding vertical tail 34 and stabilizers 36. The top of the elongate fuselage 26 is comprised of a flat surface 38 that is recessed into the fuselage 26. The single, pivotal wing 40 is secured to the top of the fuselage by the deployment mechanism 42 to be described in detail below. It is noted that the single pivotal wing 40 has a cord dimension that is substantially equal to the diameter of the fuselage of the aircraft 26 and that the wing 40 in its captive carry position as illustrated in FIG. 2 is positioned within the recess area 38 of the fuselage. Also illustrated in FIG. 2 is the pair of quick release mechanisms 44 which extend through apertures 46 in the wing 40 as is shown more clearly in FIG. 7 described below.

Referring to FIG. 3 the single pivotal wing aircraft of the present invention is illustrated in isometric view in its free flight extended position.

FIG. 4 is a partially cut away side view of the single, pivotal wing aircraft 26 of the present invention illustrating how the single pivotal wing 40 is positioned within the recessed area 48 immediately above the flat surface 38 at the top of the aircraft 26.

Figure 7:
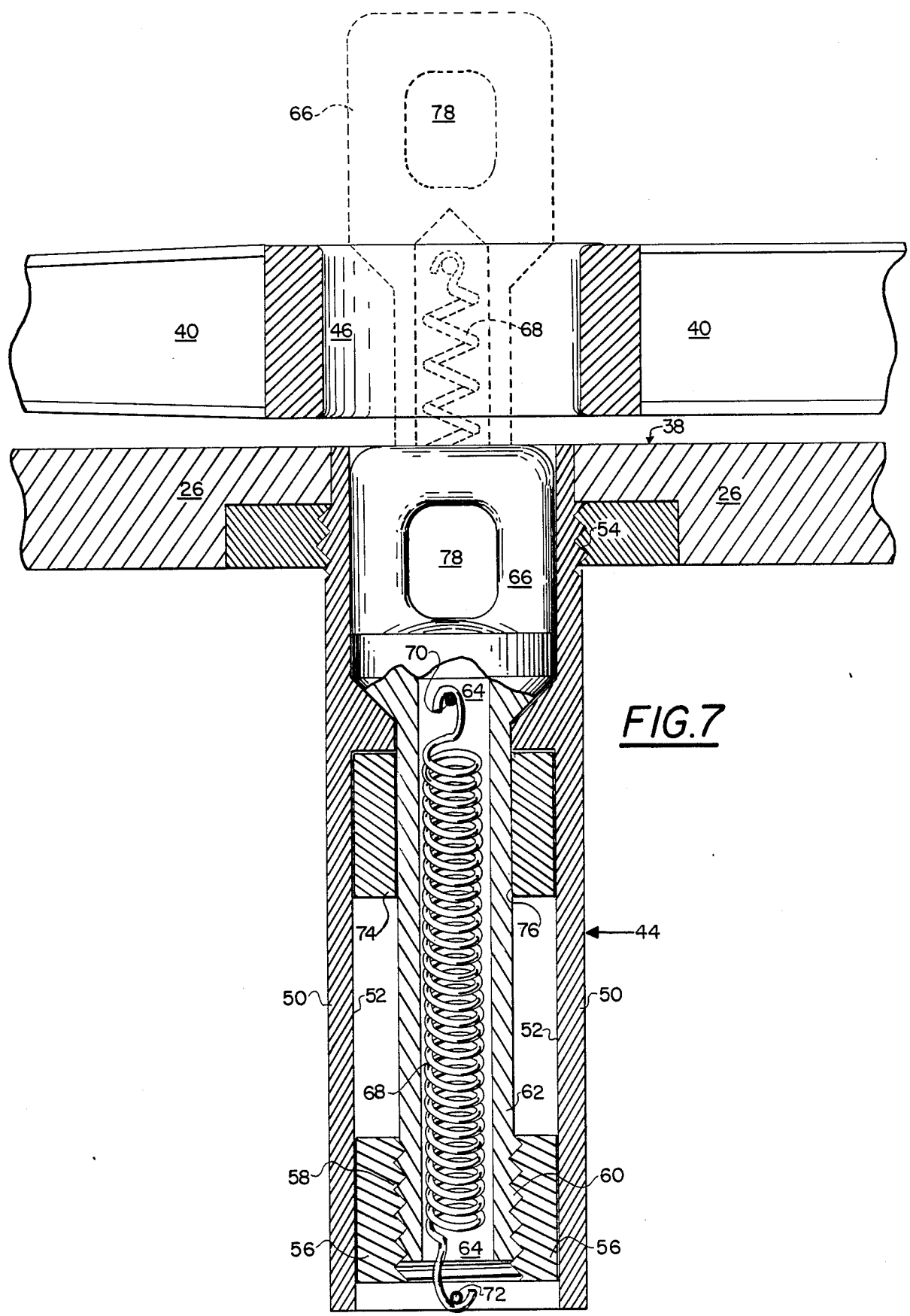
FIG. 7 is a cross section side view of the attachment mechanism of the present invention.

Referring now to FIG. 7 there is illustrated the quick release retractable attachment mechanisms 44 of the present invention. Preferably there are two such mechanisms as illustrated in FIGS. 1 through 4 and, since they are identical, only one is illustrated and described with respect to FIG. 7. The quick release attachment mechanism 44 is illustrated in FIG. 7 in both the extended and retracted positions, the extended position being illustrated in dotted lines. The attachment mechanism 44 is comprised of a housing 50 forming an interior cylinder wall 52. The housing 50 is provided with exterior threaded portions 54 for threading into and thereby securing the mechanism 44 to the aircraft fuselage body 26. Mounted within the cylindrical housing 50 and in slideable engagement with the cylinder walls 52 is the moveable piston 56. Piston 56 is free to slide up and down within the cylinder formed by cylinder walls 52. Piston 56 has a female threaded channel 58 formed in its center for mating engagement with the male threaded end 60 of connecting rod 62. Connecting rod 62 is thus threaded into engagement with the piston 56 and moves in conjunction therewith. Connecting rod 62 also has a hollow core 64 extending substantially along the length thereof and terminating at the eyelet end 66 of the connecting rod 62. A tension spring 68 is connected at one end to connecting pin 70 and extends through the core 64, through the channel bored in the piston 56 and is connected at its other end to connecting pin 72. Also mounted in secure fixed position within the cylinder walls formed by cylinder 52, at the top end of the cylinder, is a rigid annular support 74 which also has a hollow core 76 for permitting the passage of the connecting rod 62 therethrough and permitting the connecting rod 62 to slide therewithin. The rigid support 74 thus serves to stabilize the connecting rod 62 to prevent it from shifting in any direction normal to the longitudinal axis of the housing 50 and also serves to prevent the piston 56 from being pulled upwards and out of the housing 50. The eyelet end 66 of the connecting rod 62 has an opening 78 for receiving an actuating pin or the like.

In its fully extended position as illustrated in dotted lines in FIG. 7, the attachment mechanism 44 extends through the aperture 46 in the wing 40 and through the aircraft fuselage body 26. The attachment mechanism 44 is maintained in its fully extended position as illustrated in dotted lines in FIG. 7 by means of an actuating pin or the like (not shown) which would pass through the opening 78 in the eyelet end 66. In this fully extended position it is readily apparent that the bias spring 68 mechanically biases the eyelet end 66 of the connecting rod towards the bottom connecting pin 72 at the bottom of the housing 50. Activation of the actuating pin (not shown) as by solenoid action or other means as are well known, serves to release the connecting rod 62 under the bias of the spring 68 thereby retracting the connecting rod from its fully extended position down through the wing structure 40 and through fuselage 26. In this fully retracted position, the wing 40 is free to be deployed into its free flight extended position by pivoting of the wing 40 upon activation of and under the bias force of the deployment mechanization 42 to be described below.

Figure 5:
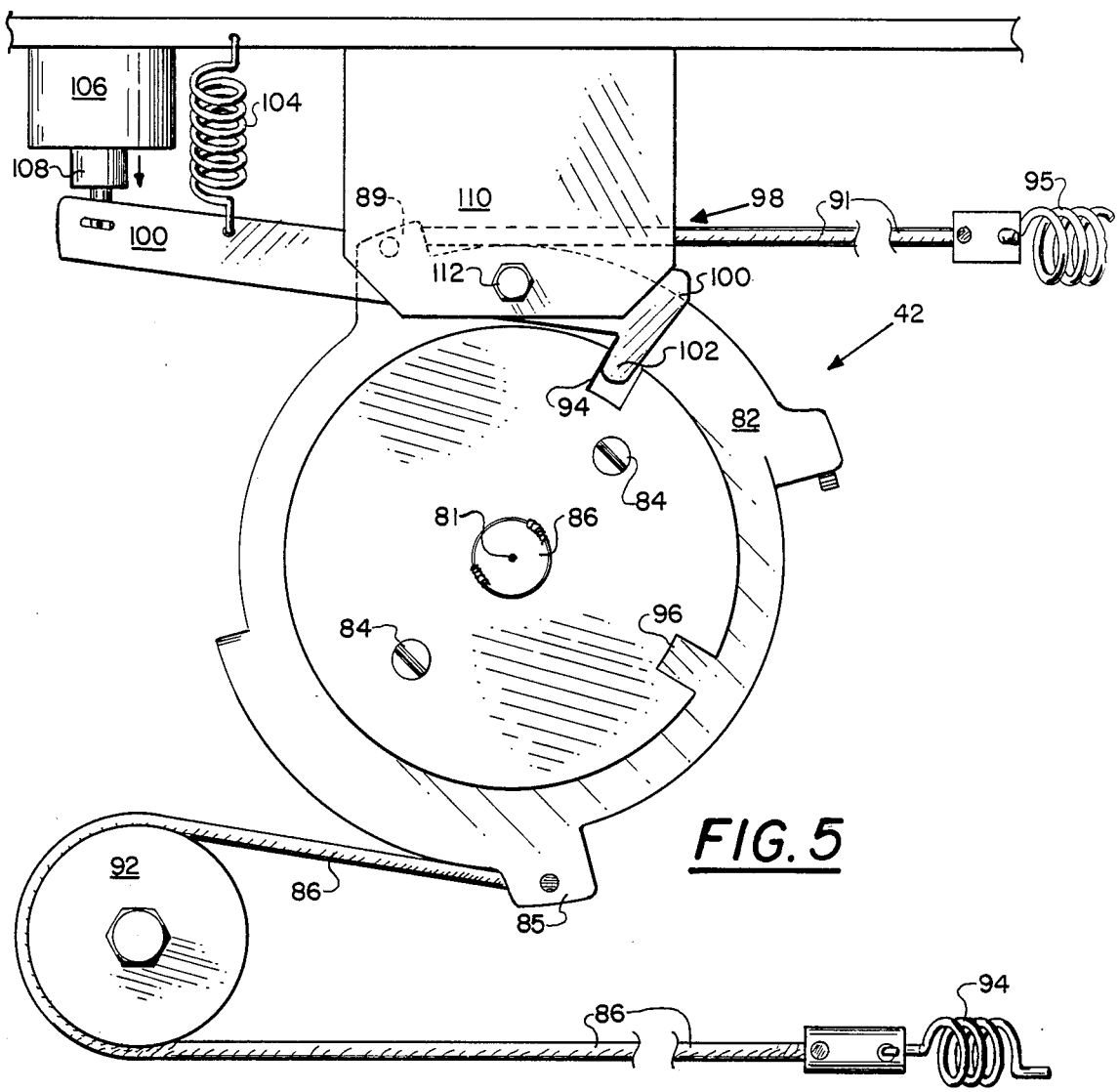
FIG. 5 is a bottom view of the deployment mechanism of the present invention.
Figure 6:
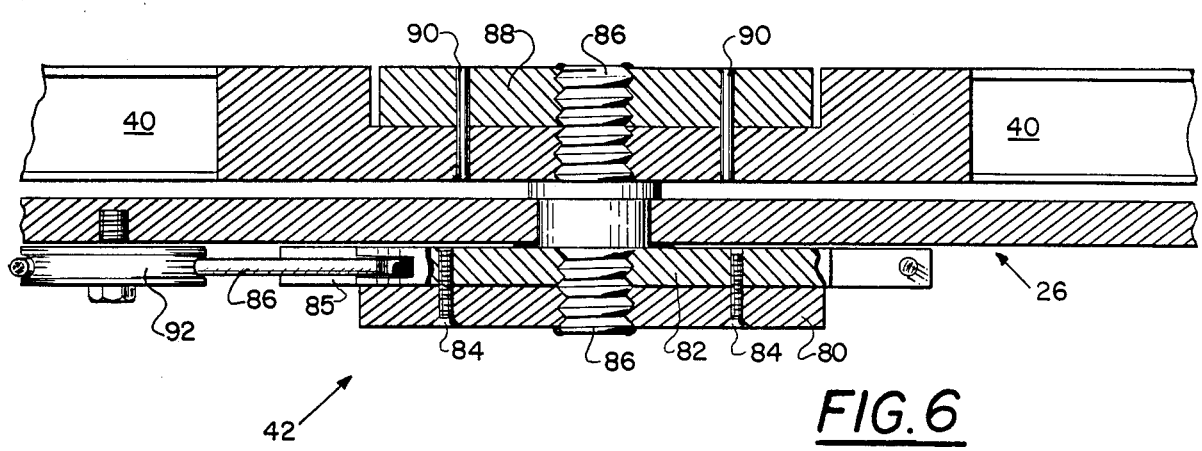
FIG. 6 is a cross section side view of the deployment mechanism of the present invention.

Referring now to FIGS. 5 and 6 there are illustrated, respectively, a bottom view and a cross section side view of the wing deployment mechanism 42 of the present invention. The wing deployment mechanism is a self-contained subassembly which rotates the wing about a pivot point 81 from the carriage position illustrated in FIG. 2 to the extended free flight position illustrated in FIG. 3. The wing deployment mechanism 42 is comprised of a generally disc shaped member 80 which is secured to a disc shaped flanged member 82 by connecting pins or rivets 84. Alternatively, the disc shaped members 80 and 82 may be formed as a unitary structure. Disc shaped flange member 82 has a connecting flange 85 for coupling to the cable 86 and a flange member 89 for coupling to the cable 91. The disc members 80 and 82 are securely fixed to connecting rod 87 which extends through the fuselage 26 of the aircraft for connection to the wing 40. A bracket 88 is securely fixed to the connecting rod 87 and also to the wing 40 by suitable means 90. The connecting rod 87 is free to rotate within the body 26 of the missile and it is apparent that the wing 40 and disc members 80 and 82 will rotate in unison. Pulley 92 is rigidly connected to the missile fuselage 26 as illustrated in FIG. 6. Cable 86, which is connected to flange 85, extends around the pulley 92 and is connected at its other end to bias spring 94 which in turn is fixed to the missile body 26. Similarly cable 91 is connected to bias spring 95. Disc member 80 is provided with a first detent notch 94 for retaining the moveable wing 40 in its extended free flight position. A second notch 96 is provided in disc member 80 for retaining the moveable wing 40 in its captive carry position.

Trip mechanism 98 is comprised of trip lever 100 with latch member 102 which extends into either notch 94 or 96. Spring member 104 connected to the aircraft body and to trip lever 100 biases trip lever 100 such that latch member 102 enters either notch 94 or 96 when aligned with that notch. A solenoid 106 or other suitable actuating means is provided with an actuating rod 108 extending therefrom and in abutment with trip lever 100. Mounting bracket 110 is provided in order to secure the trip lever 100 at pivot point 112.

As seen in FIG. 5 the wing deployment actuating mechanism 42 is illustrated in the extended free flight position. In order to load the wing into the captive carry position such that the longitudinal axis of the wing 40 is aligned with the longitudinal axis of the fuselage 26, the wing deployment mechanism discs 80 and 82 would be rotated in a counterclockwise direction against the force of bias springs 94 and 95. This rotation may be accomplished by physically rotating the wing member 40 to its captive carry position. In this position, latch member 102 will enter notch 96 thereby retaining the wing 40 in the captive carry position. Once the attachment mechanisms 44 have been released and retracted through the apertures 46 in the wing 40, trip solenoid 106 is energized in order to extend the plunger 108 into contact with trip lever 100 thereby causing a counterclockwise rotation of trip lever 100 about pivot point 112. This action causes latch member 102 to withdraw from the notch 96 thereby permitting the cable 86 to pull flange 84 to the left as illustrated in FIG. 5 under the bias of spring 94 and also permitting the cable 91 to pull the flange 89 to the right under the bias of spring 95. It is noted at this point that acuating mechanism 106 is preferably of the type such that plunger 108 is automatically withdrawn or floats freely after being extended in order to permit the latch member 102 to enter the notch 94 as the disc members 80 and 82 rotate counterclockwise as described above.

It should thus be apparent at this point that once the single pivotal wing aircraft 26 of the present invention is released from the bomb rack or other carrier that the attachment mechanisms 44 will retract into the interior of the fuselage thereby permitting the deployment mechanism 42 to cause the wing 40 to pivot around the pivot point 80 and to swing out to the fully deployed free flight position. It should also thus be readily apparent that the attachment mechanisms 44 completely disengage from the bomb rack carriage assemblies 14, 16, and 18 prior to any relative motion of the cruise missiles 20, 22 and 24 with respect to such carriage assemblies.

Obviously, many modifications and variations of the present invention are possible in the light of the above teachings, and, it is therefore understood that within the scope of the disclosed inventive concept, the invention may be practiced otherwise than as specifically described.

What is claimed is:

1. A mono wing aircraft comprising:
    an elongate aircraft fuselage;
    a single, moveable wing coupled to said fuselage, selectively positionable between a storage position and an extended free flight position, the longitudinal axis of said moveable wing being aligned with the longitudinal axis of said fuselage when in said storage position and being perpendicular to the longitudinal axis of said fuselage when in said extended free flight position;
    bias means connected to said single, moveable wing and to said fuselage for mechanically biasing said wing towards said free flight position when said wing is in said storage position;
    at least one aperture in said single, moveable wing; and
    attachment means connected to said fuselage and extending through said at least one aperture for securing said mono wing aircraft to a carrier said attachment means being retractable through said at least one aperture to allow said single, moveable wing to move towards said extended free flight position.

2. The aircraft of claim 1 wherein said attachment means comprises:
    at least one retractable fastener mechanism actuable between extended and retracted position, each said mechanism comprising: a housing having an interior cylinder wall; a piston positioned in slideable engagement with said cylinder wall; a connecting rod secured to said piston at one end and having an eyelet for attachment to a deployment actuating pin at its other end; and spring means connected to said connecting rod and to said housing for biasing said fastener mechanism towards said retracted position.

3. The aircraft of claim 2 wherein said attachment means comprises two retractable fastener mechanisms.

4. The aircraft of claim 2 wherein said connecting rod has a hollow core and wherein said spring means comprises a spring connected at one of its ends to said connecting rod, wherein said spring extends through said hollow core and is connected at its other end to said housing.

5. The aircraft of claim 4 wherein each said attachment mechanism comprises:
    an annular shaped stop positioned in engagement with said cylinder wall for preventing said piston from sliding past a predetermined point.

6. The aircraft of claim 5 wherein said piston has a threaded interior surface and said connecting rod has a threaded exterior surface for mating engagement with said piston threaded interior surface.

7. The aircraft of claim 1 wherein said bias means comprises:
    an attachment bracket secured to said wing and to said fuselage and rotatable with respect to said fuselage;

a pulley connected to said fuselage;
a cable having a first end and a second end, said first end being connected to said attachment bracket, said cable being in slideable engagement with said pulley; and
a spring having a first end connected to said fuselage and a second end connected to said cable second end for biasing said wing towards said free flight position.

8. The aircraft of claim 1 wherein:
at least a portion of the top surface of said fuselage adjacent said wing is a substantially flat surface.

9. The aircraft of claim 8 wherein said substantially flat top surface portion of said fuselage is recessed from the adjacent surface of said fuselage and wherein said wing is positioned within said recess.

10. The aircraft of claim 1 wherein said bias means is connected to said single, moveable wing at the midpoint of said wing and wherein said wing pivots about said midpoint when rotating from said storage position to said free flight position.

11. The aircraft of claim 1 wherein the cord dimension of said wing is substantially equal to the width of said fuselage.

12. A mono wing aircraft comprising:
an elongate aircraft fuselage;
a single, moveable wing coupled to said fuselage, selectively positionable between a storage position and an extended free flight position, the longitudinal axis of said moveable wing being aligned with the longitudinal axis of said fuselage when in said storage position and being perpendicular to the longitudinal axis of said fuselage when in said extended free flight position;
at least one aperture in said single, moveable wing and
attachment means connected to said fuselage for attaching said mono wing aircraft to a carrier and having an extended position wherein said attachment means extends through said at least one aperture and further being retractable through said at least one aperture to a retracted position so as to enable said single moveable wing to move toward said free flight position.

13. A mono wing aircraft comprising:
an elongated aircraft fuselage:
a single, moveable wing coupled to said fuselage, selectively positionable between a storage position and an extended free-flight position, the longitudinal axis of said moveable wing being aligned with the longitudinal axis of said fuselage when in said storage position and being perpendicular to the longitudinal axis of said fuselage when in said extended free flight position;
bias means connected to said single, moveable wing and to said fuselage for exerting a force on said wing during the entire time said wing is in said storage position for predisposing said wing toward said extended free flight position;
said bias means comprising:
an attachment bracket comprising a disc shaped member having a connecting rod coupled thereto and extending perpendicularly therefore for attachment to said wing and for extending through said fuselage in rotatable engagement therewith;
a pulley connected to said fuselage;
a cable having a first end and a second end, said first end being connected to said attachment bracket, said cable being in slidable engagement with said pulley;
a spring having a first end connected to said fuselage and a second end connected said cable second end for biasing said wing towards said free flight position; said aircraft further comprising:
latch means having a latched and an unlatched position for preventing the movement of said disc shaped member when in said latched position, said disc shaped member including first and second notches for receiving said latch means, said latch means further comprising a pivot rod actuable between latched and unlatched positions; and
a second cable having a first end and a second end, said first end of said second cable being attached to said attachment bracket and fruther comprising a second spring having a first end connected to said fuselage and a second end connected to said second cable second end for biasing said wing towards said free flight position.

14. The aircraft of claim 13 further comprising:
a selectively actuable solenoid operably coupled to said pivot rod for moving said pivot rod from said latched to said unlatched position when said solenoid is actuated.

15. The aircraft of claim 14 wherein:
said solenoid is a free floating solenoid.

16. The aircraft of claim 15 wherein:
said first and second notches are disposed at an angle of 90° with respect to each other.

17. A mono wing aircraft comprising:
an elongate aircraft fuselage;
a single, movable wing coupled to said fuselage, selectively positionable between a storage position and an extended free flight position, the longitudinal axis of said moveable wing being aligned with the longitudinal axis of said fuselage when in said storage position and being perpendicular to the longitudinal axis of said fuselage when in said extended free flight position; and
attachment means connected to said fuselage for attaching said mono wing aircraft to a carrier, said attachment means having an extended position for attachment of said mono wing aircraft to a carrier and a retracted position when said attachment means is not connected to said carrier, wherein said attachment means retracts within said aircraft fuselage when in said retracted position.

18. The mono wing aircraft of claim 17 wherein:
said carrier is the bomb rack of a mother ship.

19. The monowing aircraft of claim 17 further comprising:
a jet engine located within said elongate aircraft fuselage.

20. A mono wing aircraft comprising:
an elongate aircraft fuselage;
a single, moveable wing coupled to said fuselage, selectively positionable between a storage position and an extended free flight position, the longitudinal axis of said moveable wing being aligned with the longitudinal axis of said fuselage when in said storage position and being perpendicular to the longitudinal axis of said fuselage when in said extended free flight position;

attachment means connected to said fuselage for attaching said mono wing aircraft to a carrier, said attachment means comprising:
- a cylinder having an interior cylinder wall, a first end and a second end and having means for connection to said fuselage;
- a piston positioned in slidable engagement with said cylinder wall;
- a connecting rod having extended and retracted positions and having a first end connected to said piston and a second end for releaseable engagement with a deployment actuating mechanism connected to said carrier; and
- spring means connected to said connecting rod and to said cylinder for biasing said connecting rod toward said cylinder second end.

21. The mono wing aircraft of claim 20 wherein:
said connecting rod has a hollow core; and
said spring means extends through said hollow core.

22. The mono wing aircraft of claim 21 further comprising:
means in engagement with said cylinder for preventing said piston from sliding past a predetermined point.

23. The mono wing aircraft of claim 22 wherein:
said preventing means comprises a doughnut-shaped stop secured in a fixed location against said cylinder and having a passageway therein; and
said connecting rod extending through said passageway.

24. The mono wing aircraft of claim 23 wherein said piston has a threaded interior surface and said connecting rod has a threaded exterior surface for mating engagement with said piston threaded interior surface.

25. The mono wing aircraft of claim 20 wherein said connecting rod second end comprises an eyelet.

26. A method of air launching a plurality of winged cruise missiles and for maximizing the number of cruise missiles that can be stored and launched from the bomb racks of a carrier aircraft having such bomb racks comprising the steps of:
providing a plurality of cruise missiles each comprising:
an elongate aircraft fuselage having a cruise missile engine contained therewithin; a single, movable wing coupled to said fuselage, selectively positionable between a storage position and an extended free flight position, the longitudinal axis of said movable wing being aligned with the longitudinal axis of said fuselage when in said storage position and being perpendicular to the longitudinal axis of said fuselage when in said extended free flight position;
releasably attaching each said cruise missile to one of said bomb racks with said single, movable wing in said storage position with an attachment means for attaching each said cruise missile to one said bomb rack; and
releasing said attachment means to launch at least one of said cruise missiles such that said attachment means completely disengages from said bomb rack prior to any relative motion of said cruise missile with respect to said bomb rack, wherein said attachment means comprises means having an extended position for attachment of said cruise missile to said bomb rack and a retracted position when said attachment means is not connected to said bomb rack, and wherein said attachment means retracts within said fuselage.

27. A swing wing cruise missile system for attachment to a bomb rack comprising:
at least one cruise missile comprising:
an elongate aircraft fuselage having a cruise missile engine contained therewithin;
a single, movable wing coupled to said fuselage, selectively positionable between a storage position and an extended free flight position, the longitudinal axis of said movable wing being aligned with the longitudinal axis of said fuselage when in said storage position and being perpendicular to the longitudinal axis of said fuselage when in said extended free flight position;
means connected to said fuselage for releasably attaching said cruise missile to said bomb rack; said means for releasably attaching being completely disengaged from said bomb rack prior to any relative motion of said cruise missile with respect to said bomb rack, wherein said means for releasably attaching has an extended position when said cruise missile is attached to said bomb rack and a retracted position when said means for releasing attaching is disconnected from said bomb rack and wherein said means for releasably attaching retracts within said missile fuselage upon release from said bomb rack.

28. The swing wing cruise missile system of claim 27 wherein said cruise missile system comprises a plurality of cruise missiles.

29. The swing wing cruise missile system of claim 27 wherein said at least one cruise missile includes a jet engine.

* * * * *